United States Patent
Sato et al.

(10) Patent No.: US 12,466,761 B2
(45) Date of Patent: Nov. 11, 2025

(54) LOW TEMPERATURE CO-FIRED SUBSTRATE COMPOSITION

(71) Applicant: Okamoto Glass Co., Ltd., Kashiwa (JP)

(72) Inventors: Keito Sato, Kashiwa (JP); Nobuhito Takeshima, Kashiwa (JP)

(73) Assignee: Okamoto Glass Co., Ltd., Kashiwa (JP)

( * ) Notice: Subject to any disclaimer, the term of this patent is extended or adjusted under 35 U.S.C. 154(b) by 665 days.

(21) Appl. No.: 17/802,528

(22) PCT Filed: May 17, 2021

(86) PCT No.: PCT/JP2021/018539
§ 371 (c)(1),
(2) Date: Aug. 26, 2022

(87) PCT Pub. No.: WO2022/054337
PCT Pub. Date: Mar. 17, 2022

(65) Prior Publication Data
US 2023/0096796 A1   Mar. 30, 2023

(30) Foreign Application Priority Data
Sep. 14, 2020   (JP) .................... 2020-153478

(51) Int. Cl.
*C03C 3/089* (2006.01)
*C03C 4/16* (2006.01)
(Continued)

(52) U.S. Cl.
CPC ............... *C03C 3/089* (2013.01); *C03C 4/16* (2013.01); *C03C 12/00* (2013.01); *C03C 14/004* (2013.01);
(Continued)

(58) Field of Classification Search
None
See application file for complete search history.

(56) References Cited

U.S. PATENT DOCUMENTS

| 10,562,809 B2 | 2/2020 | Gleason et al. |
| 2018/0016192 A1 | 1/2018 | Liu et al. |
| 2018/0057395 A1* | 3/2018 | Liu .................... C03C 4/16 |

FOREIGN PATENT DOCUMENTS

| JP | H05-238813 A | 9/1993 |
| JP | H07-48171 A | 2/1995 |

(Continued)

OTHER PUBLICATIONS

International Search Report for PCT/JP2021/018539 dated Jul. 13, 2021.

*Primary Examiner* — Amber R Orlando
*Assistant Examiner* — Paul Alan Forsyth
(74) *Attorney, Agent, or Firm* — Yokoi & Co., U.S.A.; Toshiyuki Yokoi

(57) ABSTRACT

It is demanded that a LTCC substrate composition capable of maintaining low relative permittivity k and high Q value without having a reactivity with a silver which is an electrode material and causing migration of the silver during a co-firing operation at a low temperature. Provided with a low temperature co-fired substrate composition containing 83 to 91 wt. % of $CaO$—$B_2O_3$—$SiO_2$ based glass powder, 7.5 to 14 wt. % of two or more kinds of nanometer-sized $SiO_2$ powders having different ranges of particle diameter and 1.5 to 3 wt. % of β-wollastonite powder as a crystallization agent wherein the glass powder contains 40.0 to 45.0 wt. % of CaO, 9.0 to 20.0 wt. % of $B_2O_3$ and 40.0 to 46.0 wt. % of $SiO_2$.

1 Claim, 5 Drawing Sheets

(51) Int. Cl.
*C03C 12/00* (2006.01)
*C03C 14/00* (2006.01)
*C03C 17/06* (2006.01)

(52) U.S. Cl.
CPC .......... *C03C 17/06* (2013.01); *C03C 2214/04* (2013.01); *C03C 2217/256* (2013.01)

(56) References Cited

FOREIGN PATENT DOCUMENTS

| | | | |
|---|---|---|---|
| JP | 2002-308646 A | 10/2002 | |
| JP | 2004-269289 A | 9/2004 | |

* cited by examiner without adding β-wollastonite adding β-wollastonite powder adding β-wollastonite powder and nanometer-sized SiO2 powder

LOW TEMPERATURE CO-FIRED SUBSTRATE COMPOSITION

TECHNICAL FIELD

The present invention relates to a low temperature co-fired (simultaneously fired) ceramic (LTCC) substrate composition mainly used for a small size integrated module for wireless communication.

BACKGROUND ART

Tablet terminals including a mobile phone and a smartphone have spread rapidly. A lot of circuit chips are integrated into the above described terminals. In particular, low temperature co-fired (simultaneously fired) ceramic (LTCC: Low Temperature Co-fired Ceramics) substrates are widely used for front-end modules. The front-end means an element directly communicates with the outside for displaying the information for the user, receiving an instruction and inputting/outputting the information with the other systems, for example. The front-end module means a very small size integrated module integrated with various functional components used for wireless front-end circuit such as LTE which is one of communication standards of the mobile phone, Wi-Fi and GPS. The LTCC substrate is a kind of ceramics used for electronic materials. This substrate is called as the LTCC because it is formed by simultaneously burning a ceramic carrier structure, a conductive resistor and a dielectric material in a furnace of less than 1000° C. The LTCC substrate is used as an electronic circuit substrate by integrating a capacitor, a resistor and the like on one layer and combining a plurality of layers.

In recent years, devices such as a high speed wireless device, a vehicle collision avoidance radar, a dangerous substance detection device and the like have been developed actively in the range of 30 to 300 GHz called a millimeter wave. The demand for the LTCC substrate used for the above described high frequency communication has been increased. It is known that the millimeter wave has extremely high straight advancing properties and large information transmission amount. As for the material characteristic of the LTCC substrate capable of utilizing above described properties, it is required to minimize the signal attenuation and to propagate the signal at high speed. From the above described background, the demand for the characteristics required for the substrate material used for the LTCC substrate have been increased.

Here, the signal attenuation in the high frequency region is a sum of conductor loss and dielectric loss. In the region exceeding 1 GHz, the signal attenuation caused by the dielectric loss of the LTCC substrate is dominant. In general, the dielectric loss of the dielectric body is represented by dielectric tangent (dielectric loss tangent) tan δ. However, the dielectric loss is also represented by a Q value (=1/tan δ) instead of the dielectric tangent in many cases. In addition, it is known that the relation $V \sim (k^{-1/2})$ is satisfied when a propagation speed of the signal is V and a dielectric constant is k. Accordingly, in order to maximally utilize the characteristics of the millimeter wave communication (transmit signals at high speed), the material having high Q value (High Q) and low dielectric constant (Low k) is required.

As the dielectric loss mechanism of the glass material (i.e., LTCC substrate) in the high frequency region such as the millimeter wave, a large part is occupied by deformation loss caused when mesh structure forming the glass is deformed by an electric field to cause dipolar orientation and vibration loss caused when synchronized with the applied frequency. The above described losses generally increase in proportion to the frequency. It is known that the deformation and the vibration loss are smaller in a crystal material compared to the glass which is an amorphous material since the crystal material has a stronger structure capable of reducing the deformation and the vibration. In order to reduce the above described two losses as much as possible, the method of adding a high purity filler to the glass composition such as borosilicate glass having High Q and the method of synthesizing a crystal material having High Q by a crystallized glass method can be listed.

The former method is disclosed in Patent Document 1, for example. Patent Document 1 discloses a powder of alkali borosilicate glass having a low relative permittivity and a low dielectric loss containing $Li_2O$, $Na_2O$ and $K_2O$ in a predetermined molar ratio, discloses a glass-ceramic dielectric material formed of the above described powder and 20 to 50 wt. % of ceramic filler powder and discloses a sintered body formed by sintering the glass ceramic dielectric material. In Patent Document 1, an amorphous glass not depositing crystal is preferably used for the alkali borosilicate glass since the amorphous glass has good softening fluidity when it is sintered and a dense sintered body can be obtained easily.

The latter method seems to be disclosed in Patent Document 2. Patent Document 2 describes to provide a noncrystal glass/glass ceramic containing a crystallized glass formed from $CaO$—$B_2O_3$—$SiO_2$ base having the composition of approximately 18 to 32 wt. % of $B_2O_3$ approximately 42 to 47 wt. % of CaO and approximately 28 to 40 wt. % of $SiO_2$ and a noncrystal glass having the composition of at least approximately 60 wt. % of $SiO_2$, approximately 10 to 35 wt. % of $B_2O_3$ and up to approximately 6 wt. % of alkali metal oxide.

Patent Document 3 discloses a sintered dielectric material containing a solid part containing a silica powder and a multicomponent amorphous glass before sintering and discloses the sintered dielectric material further containing a crystalline compound selected from the group consisting of a wollastonite, a calcium borate and the like.

The purpose of the inventions of the above described cited references is to provide a co-fired substrate composition capable of being fired at a low temperature of 1100° C., 1000° C. or less and having a low relative permittivity k and a high Q value (low dielectric tangent tan δ) at a high frequency region exceeding 1 GHz.

CITATION LIST

Patent Literature

Patent Document 1: Japanese Unexamined Patent Application Publication No. 2004-269269
Patent Document 2: Japanese Unexamined Patent Application Publication No. H5-238813
Patent Document 3: Japanese Unexamined Patent Application Publication No. 2019-108263

SUMMARY OF THE INVENTION

Problems to be Solved by the Invention

As described in the background art, the LTCC substrate composition having a low relative permittivity k and a high Q value has been pursued. However, as another important characteristic of the LTCC substrate, it is required not to have reactivity with the silver (Ag) which is an electrode material during a co-firing operation at a low temperature, not to cause the migration of silver and not to generate warpage in the LTCC substrate.

Patent Document 3 describes that high Q value and low relative permittivity k can be shown when only the glass component is fired without adding the silica powder but also describes that it is considered that the problems may occur when co-fired with a silver conductor for the purpose of the LTCC since the silver moves largely. In addition, Patent Document 3 describes that the addition of the silica powder to the glass component may cause the ability of adjusting the contraction of the dielectric material and the ability of control the movement of the silver in the dielectric material during the firing. However, the configuration and the effect are not revealed in Patent Document 3.

Means for Solving the Problem

In order to solve the above described conventional problems, the present invention provides a low temperature co-fired substrate composition before a co-firing process, comprising:
 (A) 83 to 91 wt. % of glass powder containing CaO—$B_2O_3$—$SiO_2$ as a basic composition;
 (B) 7.5 to 14 wt. % of $SiO_2$ powder; and
 (C) 1.5 to 3 wt. % of β-wollastonite ($CaSiO_3$) powder, wherein
 a particle diameter $D_{50}$ of the glass powder (A) is 2.0 to 3.0 μm,
 the glass powder (A) contains 40.0 to 45.0 wt. % of CaO, 9.0 to 20.0 wt. % of $B_2O_3$ and 40.0 to 46.0 wt. % of $SiO_2$ as a composition,
 the $SiO_2$ powder (B) is a filler selected from the group consisting of (1), (2) and (3):
  (1) 10 to 30 wt. % of the $SiO_2$ powder having the particle diameter $D_{50}$ of 10 to 100 nm and 70 to 90 wt. % of the $SiO_2$ powder having the particle diameter $D_{50}$ of 400 to 3000 nm;
  (2) 60 wt. % or more of the $SiO_2$ powder having the particle diameter $D_{50}$ of 100 to 400 nm and less than 40 wt. % of the $SiO_2$ powder having the particle diameter $D_{50}$ of 400 to 3000 nm; and
  (3) 4 to 20 wt. % of the $SiO_2$ powder having the particle diameter $D_{50}$ of 10 to 100 nm, 60 to 95 wt. % of the $SiO_2$ powder having the particle diameter $D_{50}$ of 100 to 400 nm and 0 to 36 wt. % of the $SiO_2$ powder having the particle diameter $D_{50}$ of 400 to 3000 nm,
 the β-wollastonite ($CaSiO_3$) powder (C) is another filler having the particle diameter $D_{50}$ of 2.0 to 3.0 μm,
 when a silver paste, which functions as an electrode, is applied on a surface of a green sheet comprised of the low temperature co-fired substrate before the co-firing process and an organic binder and the co-firing process is performed, the low temperature co-fired substrate after the co-firing process has the following properties:
 a relative permittivity k is 6.0 or less at 2.5 GHz;
 a Q value which is a reciprocal of dielectric tangent is 500 or more at 2.5 GHz; and
 a ratio $R_{420}/R_{800}$ of a reflectance $R_{420}$ in a wavelength of 420 nm with respect to a reflectance $R_{800}$ in the wavelength of 800 nm is 85% or more.

Although the low temperature co-fired substrate composition before the co-firing process contains (A) 83 to 91 wt. % of glass powder containing CaO—$B_2O_3$—$SiO_2$ as a basic composition; (B) 7.5 to 14 wt. % of $SiO_2$ powder; and (C) 1.5 to 3 wt. % of β-wollastonite ($CaSiO_3$) powder as necessary compositions, it can also contain less than 3 wt. % of an oxide such as $ZrO_2$ having high chemical stability as other compositions.

In the present invention, the concentration of the glass powder is necessarily 83 to 91 wt. %. When the concentration exceeds 91 wt. %, the relative permittivity k is too large exceeding 6.0. On the other hand, when the concentration is less than 83 wt. %, the adding amount of the $SiO_2$ powder is too large and the sinterability of the co-firing is deteriorated. As a result, the dielectric tangent tan δ is too large and the Q value is lower than 500.

Although the glass powder (A) contains 40.0 to 45.0 wt. % of CaO, 9.0 to 20.0 wt. % of $B_2O_3$ and 40.0 to 46.0 wt. % of $SiO_2$ as the composition, the glass powder (A) can also contain less than 2 wt. % of an oxide such as $Al_2O_3$, $ZrO_2$ and MgO having high chemical stability. The particle diameter $D_{50}$ of the glass powder is 2.0 to 3.0 μm. In accordance with the downsizing of the ceramic chip component, the sheet thickness (film thickness) of the LTCC substrate becomes thinner to 50 μm or less. The film thickness of the conductive paste to be co-fired is mainly 10 μm or less. When the particle diameter $D_{50}$ of the glass powder is larger than 2.0 to 3.0 μm, roughness of the LTCC substrate after the co-firing process is increased and the electrode to be co-fired is badly affected. On the other hand, when the particle diameter $D_{50}$ of the glass powder is less than 2.0 to 3.0 μm, the specific surface area is increased. Thus, in order to uniformly disperse the glass powder, the amount of the organic binder should be increased. This causes the problem that malfunction increases in the layered structure due to degreasing defects.

The basis for choosing the above described composition of the glass powder will be explained using Table 1.

The compositions shown as (a), (b), (c) and (d) in the field of the glass composition code are the glass compositions within the range of the claim of the present invention. The above described compositions have low relative permittivity k, low dielectric tangent (high Q) and not so high crystallization temperature Tc. Since there is a certain temperature difference between the crystallization temperature Tc and the glass transition temperature Tg, workability is good. On the other hand, the glass code number OG302 and OG303 do not satisfy the target values of the present invention since the concentration of $SiO_2$ is lower than 40.0 wt. %, the concentration of $B_2O_3$ is higher than 20.0 wt. % and the dielectric tangent (tan δ) is not 0.002 or less (Q valued is 500 or more). In the glass code number OG305, the concentration of CaO is slightly lower than 40 wt. % and problems are that tan δ is near the allowable limit and the crystallization temperature Tc is slightly high (890° C.). On the contrary, in OG307 where the concentration of $SiO_2$ is lower than 40 wt. % and the concentration of CaO is higher than 45 wt. %, there is no problem on tan δ and the crystallization temperature. However, there are the problems in the manufacturing process. For example, a glass layer is formed on the surface during the co-firing operation and a fusion to a firing setter (shelf board-shaped or floor board-shaped ceramic refractory used for firing) is caused. In OG310, OG311, OG315 and OG320 where the concentration of $B_2O_3$ is lower than 9.0 wt. %, the crystallinity is high, the contraction caused by crystallization is large and the remaining glass phase is small. Thus, the deviation from the contraction behavior of the silver electrode becomes large and a large warpage is generated on the LTCC substrate. In OG322 where the concentration of CaO is lower than 40 wt. %, the relative permittivity is 4.5 which is a small value. The relative permittivity becomes low even though the β-wollastonite is not deposited because the sinterability is not good (a lot of pores exist). This point is also confirmed by an electron microscope photograph. In OG315 and OG320 where the concentration of $SiO_2$ is higher than 46.0 wt. % and the concentration of $B_2O_3$ is lower than 9.0 wt. %, the remaining glass phase is small and the contraction caused by crystallization is large. Thus, a warpage is generated. In addition, when the concentration of $SiO_2$ is higher than 46.0 wt. % and the concentration of CaO is lower than 40.0 wt. %, the obtained glass is devitrified. Thus, this composition is not listed in Table 1.

TABLE 1

| glass composition code | (a) | (b) | (c) | (d) | | | |
|---|---|---|---|---|---|---|---|
| glass code number | OG301 | OG325 | OG323 | OG326 | OG302 | OG303 | OG305 |
| composition [wt %] $SiO_2$ | 45.65 | 43.47 | 40.12 | 43.74 | 39.81 | 34.17 | 42.70 |
| CaO | 42.60 | 43.47 | 40.12 | 43.74 | 37.14 | 31.89 | 39.84 |
| $B_2O_3$ | 11.75 | 11.61 | 18.42 | 11.67 | 23.05 | 33.94 | 17.46 |
| $Al_2O_3$ | 0.00 | 0.61 | 0.57 | 0.00 | 0.00 | 0.00 | 0.00 |
| $ZrO_2$ | 0.00 | 0.64 | 0.59 | 0.65 | 0.00 | 0.00 | 0.00 |
| MgO | 0.00 | 0.20 | 0.18 | 0.20 | 0.00 | 0.00 | 0.00 |
| DTA [° C.] glass transition temperature Tg | 680 | 675 | 660 | 670 | 670 | 660 | 670 |
| softening point Ts | 780 | 770 | 755 | 770 | — | 865 | 785 |
| crystallization temperature Tc | 850 | 830 | 855 | 815 | 890 | 925 | 890 |
| relative permittivity k | 6.2 | 6.4 | 6.7 | 6.5 | 3.9 | 6.7 | 6.4 |
| dielectric tangent (tan δ) | 0.0003 | 0.0011 | 0.0018 | 0.0006 | 0.0330 | 0.0260 | 0.0019 |

| glass composition code | | | | | | |
|---|---|---|---|---|---|---|
| glass code number | OG307 | OG310 | OG311 | OG315 | OG320 | OG322 |
| composition [wt %] $SiO_2$ | 35.33 | 46.18 | 45.03 | 48.66 | 48.17 | 42.94 |
| CaO | 47.12 | 47.87 | 42.03 | 45.40 | 44.96 | 37.30 |
| $B_2O_3$ | 17.55 | 5.95 | 8.70 | 5.94 | 5.88 | 18.42 |
| $Al_2O_3$ | 0.00 | 0.00 | 4.24 | 0.00 | 0.98 | 0.57 |
| $ZrO_2$ | 0.00 | 0.00 | 0.00 | 0.00 | 0.00 | 0.59 |
| MgO | 0.00 | 0.00 | 0.00 | 0.00 | 0.00 | 0.18 |
| DTA [° C.] glass transition temperature Tg | 660 | 705 | 685 | 690 | 700 | 660 |
| softening point Ts | 760 | 820 | 810 | 795 | 810 | 865 |
| crystallization temperature Tc | 800 | 840 | 875 | 820 | 850 | 925 |
| relative permittivity k | 6.6 | 6.5 | 7.6 | 6.4 | 6.4 | 4.5 |
| dielectric tangent (tan δ) | 0.0008 | 0.0003 | 0.0031 | 0.0004 | 0.0008 | 0.0014 |

In the present invention, the β-wollastonite crystal is deposited as a main crystal phase from $CaO$—$B_2O_3$—$SiO_2$ based glass having the composition of (a), (b), (c) and (d) selected in the previous paragraph by using β-wollastonite powder which is the filler is used as a crystallization agent. Note that $CaB_2O_4$ crystal may be partly deposited as an auxiliary crystal phase in some cases. β-wollastonite is more preferable than α-wollastonite because the relative permittivity k is lower. It is enough to add 1.5 to 3.0 wt. % of the β-wollastonite powder for making the β-wollastonite powder function as a crystal nucleus. If the amount of the β-wollastonite powder is smaller than the above described range, the crystallization effect is reduced. If the amount of the β-wollastonite powder is larger than the above described range, the effect is not changed. In addition, the particle diameter $D_{50}$ of the β-wollastonite powder is suitably 2.0 to 3.0 μm which is approximately same as the particle diameter $D_{50}$ of the glass powder A.

In the present invention, the $SiO_2$ powder which is the filler is used for reducing the relative permittivity k. Furthermore, a part of the $SiO_2$ powder is taken in a $B_2O_3$-rich glass phase remained after the crystal is deposited. A part of the $SiO_2$ powder surrounds the $B_2O_3$-rich remaining glass phase. Thus, the interaction with the silver electrode can be suppressed and the deterioration of the electrode caused by the migration of the silver can be suppressed. In order to exhibit the above described function of the $SiO_2$ powder, the inventor found that two or more kinds of nanometer-sized $SiO_2$ powders having different ranges of particle diameter should be used.

As for the amount of the $SiO_2$ powder to be added, it is necessary to add 7.5 to 14 wt. % of the $SiO_2$ powder. If the amount is below 7.5 wt. %, the relative permittivity k exceeds 6.0, the later described yellowing of the silver electrode is remarkable and $R_{420}/R_{800}$ is below 85%. On the other hand, if the amount exceeds 14 wt. %, the sinterability in the co-firing process is deteriorated and tan δ is increased (Q value is below 500).

In one embodiment, it is preferable that the $SiO_2$ powder is formed of 10 to 30 wt. % of the $SiO_2$ powder having the particle diameter $D_{50}$ of 10 to 100 nm and 70 to 90 wt. % of the $SiO_2$ powder having the particle diameter $D_{50}$ of 400 to 3000 nm. In another embodiment, it is preferable that the $SiO_2$ powder is formed of 60 wt. % or more of the $SiO_2$ powder having the particle diameter $D_{50}$ of 100 to 400 nm and less than 40 wt. % of the $SiO_2$ powder having the particle diameter $D_{50}$ of 400 to 3000 nm. In a further embodiment, it is preferable that the $SiO_2$ powder is formed of 4 to 20 wt. % of the $SiO_2$ powder having the particle diameter $D_{50}$ of 10 to 100 nm, 60 to 95 wt. % of the $SiO_2$ powder having the particle diameter $D_{50}$ of 100 to 400 nm and 0 to 36 wt. % of the $SiO_2$ powder having the particle diameter $D_{50}$ of 400 to 3000 nm. When the composition is not within the above described range, it is difficult to suppress the interaction with the silver electrode and suppress the deterioration of the electrode caused by the migration of the silver while keeping low k value and high Q value.

The interaction between the silver electrode and the remaining glass phase and the migration of the silver to the remaining glass phase can be evaluated by measuring the reflectance of the LTCC substrate after the co-firing process. This is because the silver atoms transferred to the remaining glass phase are colloidal particles and a selective absorption peculiar to the silver colloid occurs near the wavelength of 420 nm and the colloidal particles are observed as the yellowing. Accordingly, the moving amount of the silver atoms to the remaining glass phase can be relatively evaluated from the degree of the yellowing by measuring a ratio $R_{420}/R_{800}$ between a reflectance $R_{800}$ in the wavelength of 800 nm not affected by the silver colloidal particles and a reflectance $R_{420}$ where the reflectance is lowered by the absorption of the silver colloidal particles.

By adopting the composition of the present invention, when a silver paste, which functions as an electrode, is applied on a surface of a green sheet comprised of the low temperature co-fired substrate before the co-firing process and an organic binder and the co-firing process is performed, the low temperature co-fired substrate after the co-firing process can have the following properties: a relative permittivity k is 6.0 or less at 2.5 GHz; a Q value which is a reciprocal (1/tan δ) of dielectric tangent is 500 or more at 2.5 GHz; and a ratio $R_{420}/R_{800}$ (in percent) of a reflectance $R_{420}$ in a wavelength of 420 nm with respect to a reflectance $R_{800}$ in the wavelength of 800 nm is 85% or more.

Effects of the Invention

In the low temperature co-fired substrate composition of the present invention, the β-wollastonite powder accelerates the deposition of the β-wollastonite crystal in the CaO—$B_2O_3$—$SiO_2$ glass, the $SiO_2$ powder is taken in the $B_2O_3$-rich glass phase remained after the deposition and the $SiO_2$ powder surrounds around the remaining glass phase. Thus, the interaction between the $B_2O_3$-rich remaining glass phase and the silver electrode and the migration of the silver to the $B_2O_3$-rich remaining glass phase can be suppressed. Consequently, the LTCC substrate can be obtained without causing yellowing of the silver electrode (deterioration of silver electrode) while maintaining low k value and high Q value.

MODES FOR CARRYING OUT THE INVENTION

Screening of Glass Composition

Figure 1:
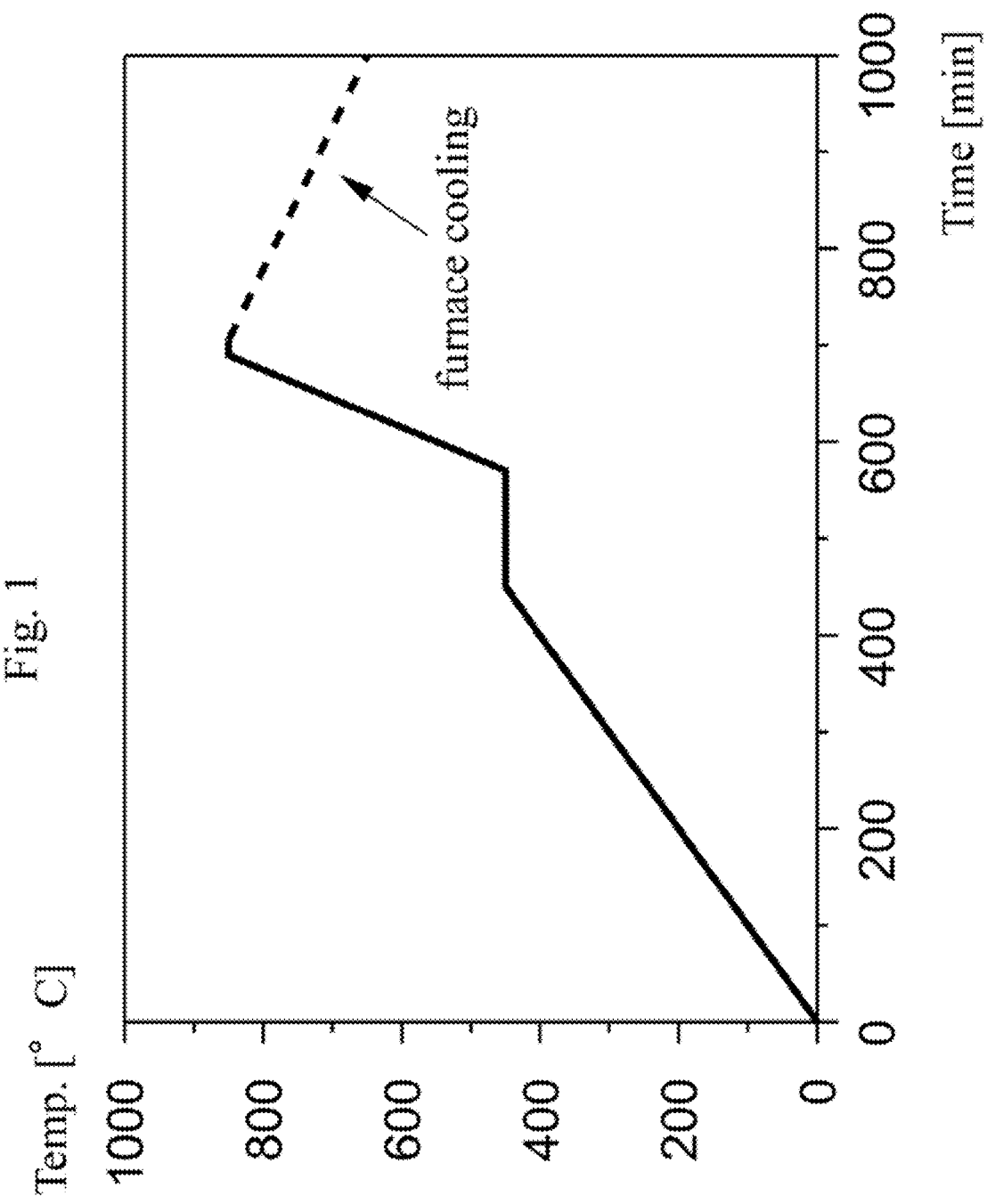
FIG. 1 shows a temperature profile when firing a low temperature co-fired substrate composition of the present invention.

Before exploiting the present invention, screening of glass composition was performed for determining the glass composition suitable for being used for the present invention. First, a green sheet was manufactured from the glass powder by the method shown below (without adding the $SiO_2$ powder and the β-wollastonite) and the green sheet was fired by the temperature profile shown in FIG. 1. Thus, the substrate after the firing process was obtained. The relative permittivity k and tan δ (Q value) of the substrate after the firing process were measured. The result is shown in Table 1. The glass composition codes (a), (b), (c) and (d) were selected as the glass powder A for the reasons described above.

EXAMPLES

Preparation of Glass Powder A

As a raw material, a raw material batch formed by mixing $SiO_2$, $CaCO_3$, $B_2O_3$ or $H_3BO_3$, $Al(OH)_3$ or $Al_2O_3$, $ZrO_2$ and $MgCO_3$ to have an oxide ratio (wt. %) shown in (a), (b), (c) or (d) of Table 1 was filled in a platinum crucible, the mixture was melted in an electric furnace in conditions of 1450° C. to 1500° C. and 60 to 180 minutes, and the molten material was entered into water to cool and dry the molten material. Thus, the glass having the compositions shown in (a), (b), (c) or (d) were obtained. The obtained glass was classified using a sieve having a mesh size of 4 mm. The glass passed through the sieve was crushed and classified using an ultrafine grinder incorporating a medium stirring type classifier where the crushing condition was adjusted so that the particle diameter $D_{50}$ was 2.0 to 3.0 μm. Thus, the glass powder A having the particle diameter $D_{50}$ shown in FIG. 3 was obtained. The particle diameter $D_{50}$ was measured by a laser diffraction method using a particle-size-distribution measurement device LA-950V2 manufactured by HORIBA, Ltd. The measurement result is shown in Table 3.

Preparation of $SiO_2$ Powder B

Regarding the $SiO_2$ powder B, AEROSIL (registered trademark) R805 manufactured by NIPPON AEROSIL CO., LTD. was used as the powder of 10 to 100 nm, SO-C1 manufactured by Admatechs Company Limited was used as the powder of 100 to 400 nm, and SO-C2 manufactured by Admatechs Company Limited or Fuselex/X manufactured by TATSUMORI LTD. was used as the powder of 400 to 3000 nm. The compounding ratio of each particle diameter of $SiO_2$ powder is shown in Table 3.

Preparation of β-Wollastonite Powder C

Commercially available crystal powder of β-wollastonite was crushed using a dry ball mill while adjusting the crushing time so that the particle diameter $D_{50}$ was 2.0 to 3.0 μm and classified using a sieve having a mesh size of 100 μm. Thus, the β-wollastonite powder having the particle diameter $D_{50}$ of 2.4 μm was obtained.

Manufacturing of Green Sheet for Low Temperature Co-Fired Substrate

Each of composition materials A, B and C was weighed so that the ratio (wt. %) shown in Table 3 was satisfied and they were mixed together with an organic binder having the composition (wt. %) shown in Table 2 in a resin-made pot having alumina balls for 16 to 24 hours. Thus, a green sheet precursor slurry was obtained. The amount of the organic binder contained in the slurry was 46 to 49 wt. %. The obtained slurry was deaerated in a vacuum by a rotary pump, a film having a gap of approximately 0.35 mm was formed by a comma direct method and the film was passed through drying zones set to 60° C., 95° C. and 100° C. for three minutes each. Thus, a green sheet having a thickness of approximately 0.12 mm was obtained.

TABLE 2

| composition | concentration (wt. %) |
|---|---|
| cyclohexanone | 48.61 |
| ethanol | 32.41 |
| plasticizer | 6.4 |
| dispersant | 0.85 |
| polyvinyl butyral | 11.73 |

Measurement of Relative Permittivity

Forty layers of the obtained green sheets were laminated by applying a hydrostatic pressure using a hot water laminator/WL28-45-200 manufactured by NIKKISO CO., LTD. in condition that the water temperature of 70° C., the pressure of 20.7 MPa and 10 minutes, and then the green sheets were fired in accordance with the temperature program shown in FIG. 1. Thus, a low temperature fired substrate was obtained. Here, the temperature rising speed was 1° C./min until 450° C. and the temperature was kept at 450° C. for 2 hours to perform a debinder treatment. After that the temperature was raised to 850° C. in 2 hours and the temperature was kept at 850° C. for 15 minutes to perform a crystallization treatment. Note that the firing process was performed by using a muffle furnace manufactured by MOTOYAMA CO., LTD while introducing approximately 100 L/min of air. The obtained low temperature fired substrate was processed to have a shape of approximately 3×4×30 mm. Then, the relative permittivity k and dielectric tangent (tan δ) were measured by a perturbation type cavity resonator method. The Q value was calculated in condition that Q=1/tan δ. Note that dielectric characteristics were measured by using a relative permittivity/dielectric tangent measurement system TMR-2A manufactured by KEYCOM Corporation. The measurement result is shown in Table 3.

Measurement of $R_{420}/R_{800}$

Figure 2:
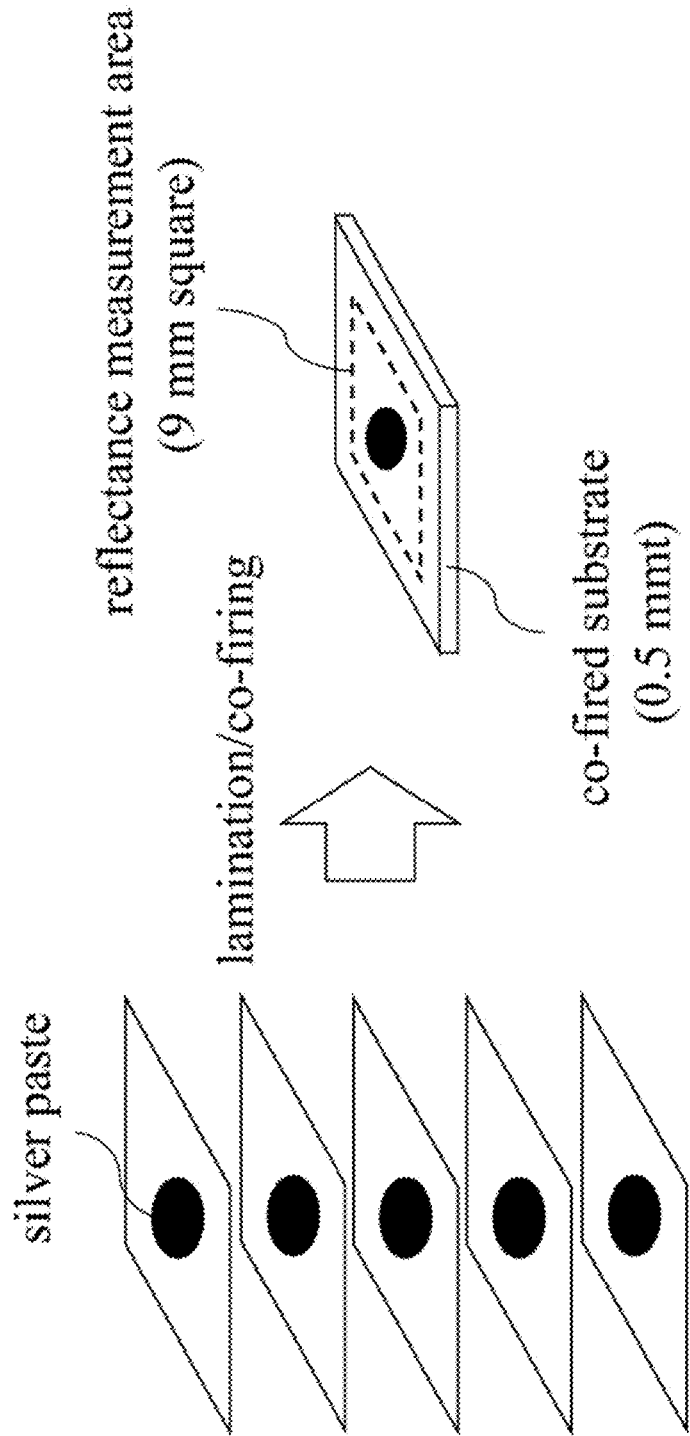
FIG. 2 is a schematic diagram showing a test body and a measurement position for measuring $R_{420}/R_{800}$.
Figure 3:
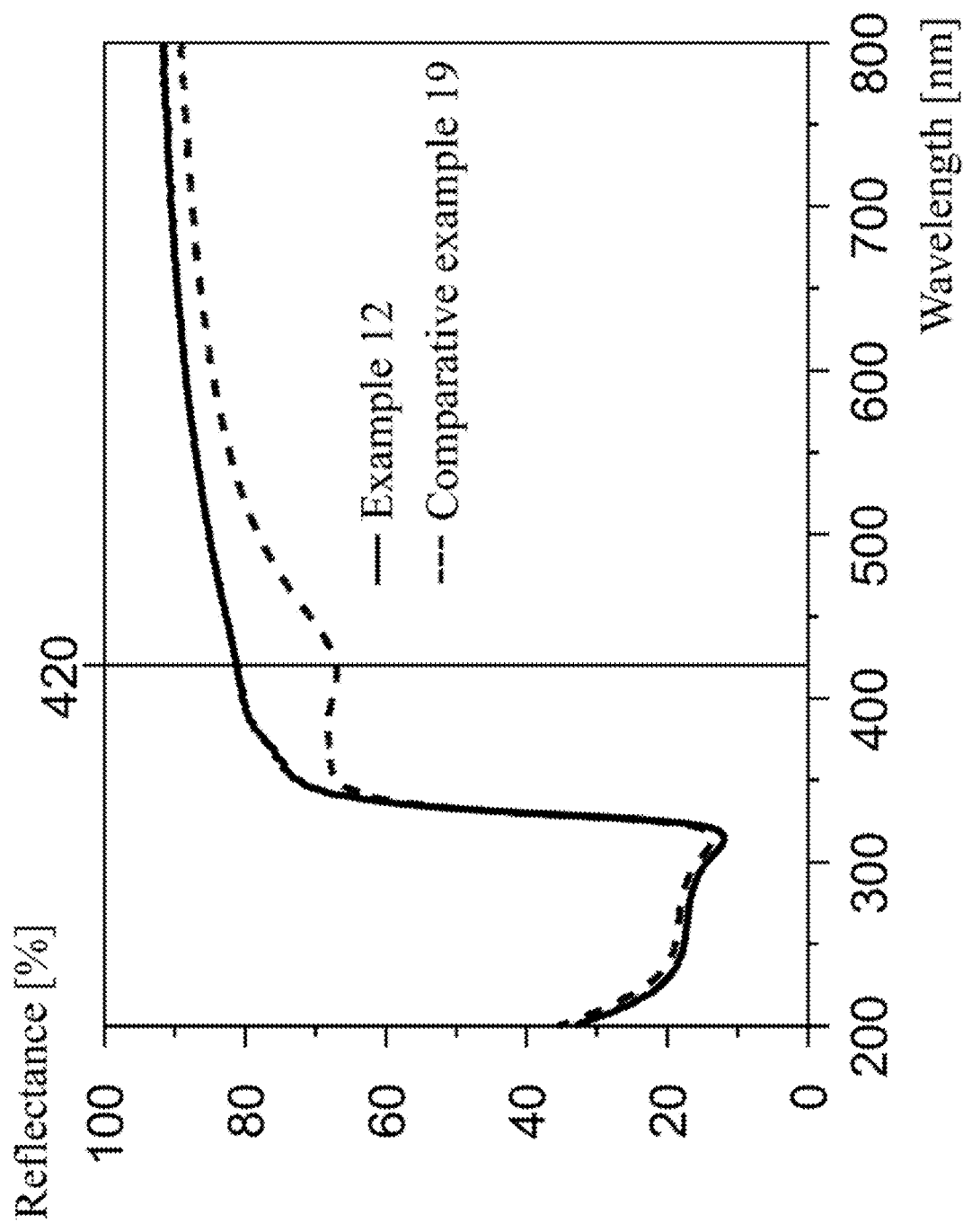
FIG. 3 shows a reflectance profile for calculating $R_{420}/R_{800}$ of Example 12 of the present invention and Comparative example 19.

The obtained green sheet was cut into 22×22 mm and a silver paste having a dimeter of 8 mm was applied on the center of the green sheet by screen printing. Five layers of green sheets were laminated so that the applied silver pastes were overlapped with each other and the green sheets were co-fired. Thus, a measuring specimen was obtained (FIG. 2). The reflectance was measured on the silver electrode of the obtained specimen by using a spectrophotometer/V-750 manufactured by JASCO Corporation within the range of 200 to 800 nm. Then, $R_{420}/R_{800}$ was calculated from the values of the reflectance of 420 nm and 800 nm (FIG. 3). The calculation result is shown in Table 3. As understood from FIG. 3, the deterioration of the reflectance was not observed in 420 nm and $R_{420}/R_{800}$ was 88.6% in Example 12, while the deterioration of the reflectance due to the silver colloid was observed in 420 nm and $R_{420}/R_{800}$ was deteriorated to 75.2% in Comparative example 19. As the silver paste to be applied, the silver paste manufactured by NORITAKE CO., LIMITED was used.

Identification of Deposited Crystal Phase

Figure 4:
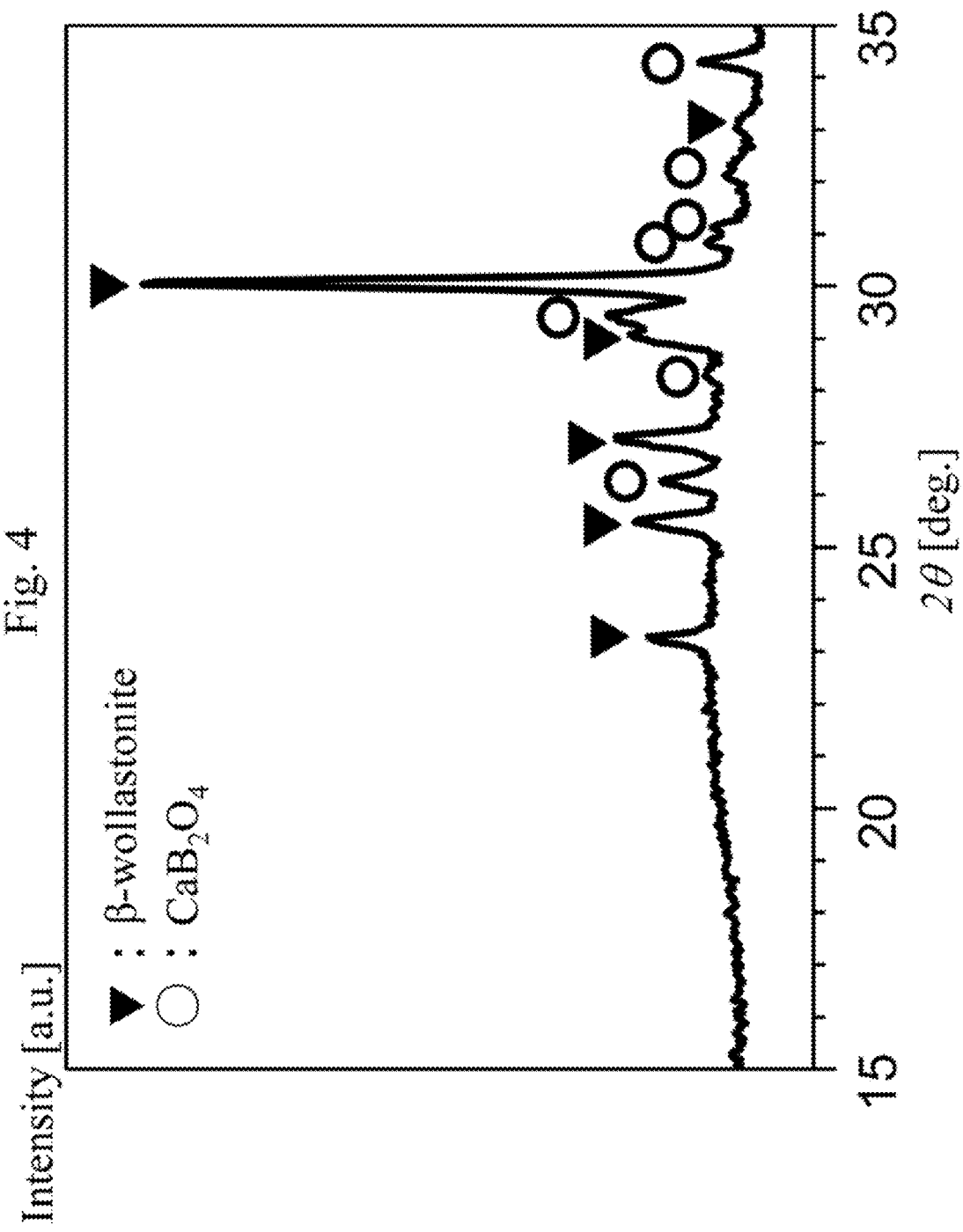
FIG. 4 is an example (Example 12) of X-ray diffraction profile of the low temperature co-fired substrate composition of the present invention after the firing process.

The low temperature fired substrate after the firing process was crushed by an alumina magnetic mortar and the measurement was performed within the range of 15 to 35 degrees by using an X-ray diffraction device/X'Pert PRO manufactured by Malvern Panalytical Ltd. Thus, the deposited crystal phase was identified from the peak positions. An example (Example 12) of the identification result is shown in FIG. 4. From the identification result, β-wollastonite was detected as the main crystal phase and $CaB_2O_4$ phase was detected as the auxiliary crystal phase.

The summary of the measurement result of the above described examples is shown in Table 3. When at least two of three kinds of nanometer-sized $SiO_2$ powder were added at the ratio described in the claim, the interaction between the $B_2O_3$-rich remaining glass phase and the silver electrode and the migration of the silver to the $B_2O_3$-rich remaining glass phase could be suppressed ($R_{420}/R_{800}$ could be 85.0% or more) while keeping low k value and high Q value.

TABLE 3

| Examples | | 1 | 2 | 3 | 4 | 5 | 6 | 7 |
|---|---|---|---|---|---|---|---|---|
| glass powder A | wt. % | 87.30 | 87.22 | 87.22 | 85.48 | 84.60 | 87.22 | 87.22 |
| $SiO_2$ powder B | | 9.70 | 10.78 | 10.78 | 12.56 | 13.46 | 10.78 | 10.78 |
| β-wollastonite powder C | | 3.00 | 2.00 | 2.00 | 1.96 | 1.94 | 2.00 | 2.00 |
| other additives | | 0.00 | 0.00 | 0.00 | 0.00 | 0.00 | 0.00 | 0.00 |
| particle diameter $D_{50}$ of glass powder A | μm | 2.0 | 2.2 | 2.2 | 2.2 | 2.2 | 2.2 | 2.2 |
| glass composition of glass powder A | code | (a) | (b) | (b) | (b) | (b) | (b) | (b) |
| $SiO_2$ powder B (particle diameter 1) | 10-100 nm | 25.00 | 18.18 | 27.27 | 15.92 | 22.29 | 0.00 | 0.00 |
| $SiO_2$ powder B (particle diameter 2) | 100-400 nm | 0.00 | 0.00 | 0.00 | 0.00 | 0.00 | 63.64 | 81.82 |
| $SiO_2$ powder B (particle diameter 3) | 400-3000 nm | 75.00 | 81.82 | 72.73 | 84.08 | 77.71 | 36.36 | 18.18 |
| particle diameter $D_{50}$ of β-wollastonite powder C | μm | 2.4 | 2.4 | 2.4 | 2.4 | 2.4 | 2.4 | 2.4 |

TABLE 3-continued

| | | | | | | | | |
|---|---|---|---|---|---|---|---|---|
| main crystal phase (wollastonite) | α or β | β | β | β | β | β | β | β |
| relative permittivity k | at 2.5 GHz | 5.72 | 5.93 | 5.82 | 5.81 | 5.59 | 5.88 | 5.90 |
| tan δ | | 0.0008 | 0.0009 | 0.0011 | 0.0012 | 0.0015 | 0.0009 | 0.0012 |
| Q value (1/tan) | | 1250 | 1111 | 909 | 833 | 667 | 1111 | 833 |
| $R_{420}/R_{800}$ (%) | | 88.3 | 86.4 | 85.6 | 87.4 | 87.6 | 85.6 | 89.3 |

| Example | | 8 | 9 | 10 | 11 | 12 | 13 | 14 | 15 |
|---|---|---|---|---|---|---|---|---|---|
| glass powder A | wt. % | 87.22 | 87.22 | 87.22 | 86.55 | 90.16 | 90.16 | 90.16 | 88.20 |
| $SiO_2$ powder B | | 10.78 | 10.78 | 10.78 | 8.56 | 7.84 | 7.84 | 7.84 | 9.80 |
| β-wollastonite powder C | | 2.00 | 2.00 | 2.00 | 1.98 | 2.00 | 2.00 | 2.00 | 2.00 |
| Other additive ($ZrO_2$) | | 0.00 | 0.00 | 0.00 | 2.91 | 0.00 | 0.00 | 0.00 | 0.00 |
| particle diameter $D_{50}$ of glass powder A | μm | 2.2 | 2.2 | 2.2 | 2.3 | 2.3 | 2.3 | 2.3 | 2.2 |
| glass composition of glass powder A | symbol | (b) | (b) | (b) | (c) | (c) | (c) | (c) | (d) |
| $SiO_2$ powder B (particle diameter 1) | 10-100 nm | 4.55 | 9.09 | 13.64 | 11.68 | 6.25 | 12.50 | 18.75 | 30.00 |
| $SiO_2$ powder B (particle diameter 2) | 100-400 nm | 63.64 | 63.64 | 63.64 | 0.00 | 93.75 | 87.50 | 81.25 | 0.00 |
| $SiO_2$ powder B (particle diameter 3) | 400~3000 nm | 31.82 | 27.27 | 22.73 | 88.32 | 0.00 | 0.00 | 0.00 | 70.00 |
| particle diameter $D_{50}$ of β-wollastonite powder C | μm | 2.4 | 2.4 | 2.4 | 2.4 | 2.4 | 2.4 | 2.4 | 2.4 |
| main crystal phase (wollastonite) | α or β | β | β | β | β | β | β | β | β |
| relative permittivity k | at 2.5 GHz | 5.87 | 5.85 | 5.73 | 5.88 | 5.89 | 5.72 | 5.54 | 5.59 |
| tan δ | | 0.0010 | 0.0013 | 0.0017 | 0.0009 | 0.0010 | 0.0011 | 0.0015 | 0.0009 |
| Q value (1/tan δ) | | 1000 | 769 | 588 | 1111 | 1000 | 909 | 667 | 1111 |
| $R_{420}/R_{800}$ (%) | | 85.2 | 89.6 | 89.1 | 87.1 | 88.6 | 88.2 | 90.6 | 86.9 |

Comparative Examples

Comparative examples are shown in Table 4. In Comparative examples 1, 6 and 18, the densities of the glass powder A, the $SiO_2$ powder B and the β-wollastonite powder C are out of the range of the claim. In other Comparative examples, the range of the particle diameter of the $SiO_2$ powder B and the content amount of the $SiO_2$ powder of that range of the particle diameter are out of the range of the claim. In Comparative example 9 and Comparative example 18, the Q value does not reach 500 which is the target value. In other Comparative examples, $R_{420}/R_{800}$ is below 85% and remarkable yellowing occurs.

From the result of the Examples and Comparative examples, the $SiO_2$ powder having a small particle diameter has a large specific surface area and attracts large amount of the $B_2O_3$-rich remaining glass phase. As a result, the migration of the silver to the $B_2O_3$-rich glass phase is suppressed. When the $SiO_2$ powder having a small particle diameter is too much, the structure after the firing process is sparse and tan δ is large although $R_{420}/R_{800}$ is large (Comparative example 9). On the contrary, when the $SiO_2$ powder having a large particle diameter is used, the structure after the firing process is relatively large and tan δ can be kept low. However, when the $SiO_2$ powder having a large particle diameter is increased, the effect of suppressing the migration of the silver to the $B_2O_3$-rich glass phase is poor and $R_{420}/R_{800}$ is small (Comparative examples 7 and 14). As a result, only when at least two of three kinds of nanometer-sized $SiO_2$ powder were added at the ratio described in the claim, the interaction between the $B_2O_3$-rich remaining glass phase and the silver electrode and the migration of the silver to the $B_2O_3$-rich remaining glass phase could be suppressed while keeping the k value of 6.0 or less and the tan δ of 0.002 or less (Q value of 500 or more).

TABLE 4

| Comparative example | | 1 | 2 | 3 | 4 | 5 |
|---|---|---|---|---|---|---|
| glass powder A | wt. % | 100.00 | 90.16 | 88.20 | 87.22 | 86.24 |
| $SiO_2$ powder B | | 0.00 | 7.84 | 9.80 | 10.78 | 11.76 |
| β-wollastonite powder C | | 0.00 | 2.00 | 2.00 | 2.00 | 2.00 |
| Other additive | | 0.00 | 0.00 | 0.00 | 0.00 | 0.00 |
| particle diameter $D_{50}$ of glass powder A | μm | 2.2 | 2.2 | 2.2 | 2.2 | 2.2 |
| glass composition of glass powder A | symbol | (b) | (b) | (b) | (b) | (b) |
| $SiO_2$ powder B (particle diameter 1) | 10-100 nm | | 0.00 | 0.00 | 0.00 | 0.00 |
| $SiO_2$ powder B (particle diameter 2) | 100-400 nm | | 0.00 | 0.00 | 0.00 | 0.00 |
| $SiO_2$ powder B (particle diameter 3) | 400-3000 nm | | 100.00 | 100.00 | 100.00 | 100.00 |

TABLE 4-continued

| | | | | | | |
|---|---|---|---|---|---|---|
| particle diameter $D_{50}$ of β-wollastonite powder C | μm | — | 2.4 | 2.4 | 2.4 | 2.4 |
| main crystal phase (wollastonite) | α or β | α | β | β | β | β |
| relative permittivity k | at 2.5 GHz | 6.40 | 6.18 | 5.96 | 5.93 | 5.84 |
| tan δ | | 0.0011 | 0.0008 | 0.0009 | 0.0008 | 0.0008 |
| Q value (1/tan δ) | | 909 | 1250 | 1111 | 1250 | 1250 |
| $R_{420}/R_{800}$ (%) | | 76.8 | 77.9 | 78.9 | 79.3 | 82.6 |

| Comparative example | | 6 | 7 | 8 | 9 | 10 |
|---|---|---|---|---|---|---|
| glass powder A | wt. % | 82.32 | 87.22 | 87.22 | 87.22 | 86.35 |
| $SiO_2$ powder B | | 15.68 | 10.78 | 10.78 | 10.78 | 11.67 |
| β-wollastonite powder C | | 2.00 | 2.00 | 2.00 | 2.00 | 1.98 |
| Other additive | | 0.00 | 0.00 | 0.00 | 0.00 | 0.00 |
| particle diameter $D_{50}$ of glass powder A | μm | 2.2 | 2.2 | 2.2 | 2.2 | 2.2 |
| glass composition of glass powder A | symbol | (b) | (b) | (b) | (b) | (b) |
| $SiO_2$ powder B (particle diameter 1) | 10-100 nm | 0.00 | 4.55 | 9.09 | 63.64 | 8.57 |
| $SiO_2$ powder B (particle diameter 2) | 100-400 nm | 0.00 | 0.00 | 0.00 | 0.00 | 0.00 |
| $SiO_2$ powder B (particle diameter 3) | 400-3000 nm | 100.00 | 95.45 | 90.91 | 36.36 | 91.43 |
| particle diameter $D_{50}$ of β-wollastonite powder C | μm | 2.4 | 2.4 | 2.4 | 2.4 | 2.4 |
| main crystal phase (wollastonite) | α or β | β | β | β | β | β |
| relative permittivity k | at 2.5 GHz | 5.60 | 5.92 | 5.90 | 5.24 | 5.95 |
| tan δ | | 0.0008 | 0.0008 | 0.0008 | 0.0023 | 0.0009 |
| Q value (1/tan δ) | | 1250 | 1250 | 1250 | 435 | 1111 |
| $R_{420}/R_{800}$ (%) | | 84.5 | 80.4 | 84.1 | 87.4 | 81.5 |

| Comparative example | | 11 | 12 | 13 | 14 | 15 | 16 |
|---|---|---|---|---|---|---|---|
| glass powder A | wt. % | 87.22 | 87.22 | 87.22 | 86.35 | 85.48 | 87.42 |
| $SiO_2$ powder B | | 10.78 | 10.78 | 10.78 | 11.67 | 12.56 | 7.64 |
| β-wollastonite powder C | | 2.00 | 2.00 | 2.00 | 1.98 | 1.96 | 2.00 |
| Other additive ($ZrO_2$) | | 0.00 | 0.00 | 0.00 | 0.00 | 0.00 | 2.94 |
| particle diameter $D_{50}$ of glass powder A | μm | 2.2 | 2.2 | 2.2 | 2.2 | 2.2 | 2.2 |
| glass composition of glass powder A | symbol | (b) | (b) | (b) | (b) | (b) | (c) |
| $SiO_2$ powder B (particle diameter 1) | 10~100 nm | 0.00 | 0.00 | 0.00 | 0.00 | 0.00 | 0.00 |
| $SiO_2$ powder B (particle diameter 2) | 100-400 nm | 18.18 | 36.36 | 54.55 | 8.57 | 15.92 | 0.00 |
| $SiO_2$ powder B (particle diameter 3) | 400-3000 nm | 81.82 | 63.64 | 45.45 | 91.43 | 84.08 | 100.00 |
| particle diameter $D_{50}$ of β-wollastonite powder C | μm | 2.4 | 2.4 | 2.4 | 2.4 | 2.4 | 2.4 |
| main crystal phase (wollastonite) | α or β | β | β | β | β | β | β |
| relative permittivity k | at 2.5 GHz | 5.95 | 5.99 | 5.88 | 5.94 | 5.84 | 5.93 |
| tan δ | | 0.0008 | 0.0008 | 0.0009 | 0.0008 | 0.0008 | 0.0008 |
| Q value (1/tan δ) | | 1250 | 1250 | 1111 | 1250 | 1250 | 1250 |
| $R_{420}/R_{800}$ (%) | | 80.8 | 82.3 | 82.7 | 78.4 | 82.7 | 79.5 |

| Comparative example | | 17 | 18 | 19 | 20 | 21 |
|---|---|---|---|---|---|---|
| glass powder A | wt. % | 86.98 | 81.30 | 90.16 | 90.16 | 88.20 |
| $SiO_2$ powder B | | 8.10 | 14.11 | 7.84 | 7.84 | 9.80 |
| β-wollastonite powder C | | 1.99 | 1.86 | 2.00 | 2.00 | 2.00 |
| Other additive ($ZrO_2$) | | 2.93 | 2.73 | 0.00 | 0.00 | 0.00 |
| particle diameter $D_{50}$ of glass powder A | μm | 2.3 | 2.3 | 2.2 | 2.3 | 2.2 |
| glass composition of glass powder A | symbol | (c) | (c) | (c) | (c) | (d) |

TABLE 4-continued

| | | | | | | |
|---|---|---|---|---|---|---|
| SiO₂ powder B (particle diameter 1) | 10~100 nm | 6.17 | 49.61 | 0.00 | 0.00 | 0.00 |
| SiO₂ powder B (particle diameter 2) | 100-400 nm | 0.00 | 0.00 | 0.00 | 50.00 | 0.00 |
| SiO₂ powder B (particle diameter 3) | 400-3000 nm | 93.83 | 50.39 | 100.00 | 50.00 | 100.00 |
| particle diameter D₅₀ of β-wollastonite powder C | μm | 2.4 | 2.4 | 2.4 | 2.4 | 2.4 |
| main crystal phase (wollastonite) | α or β | β | β | β | β | β |
| relative permittivity k | at 2.5 GHz | 5.91 | 4.19 | 5.96 | 5.79 | 5.94 |
| tan δ | | 0.0009 | 0.0028 | 0.0007 | 0.0008 | 0.0005 |
| Q value (1/tan δ) | | 1111 | 357 | 1429 | 1250 | 2000 |
| R₄₂₀/R₈₀₀ (%) | | 81.6 | 91.3 | 75.2 | 80.2 | 82.6 |

Figure 5A:
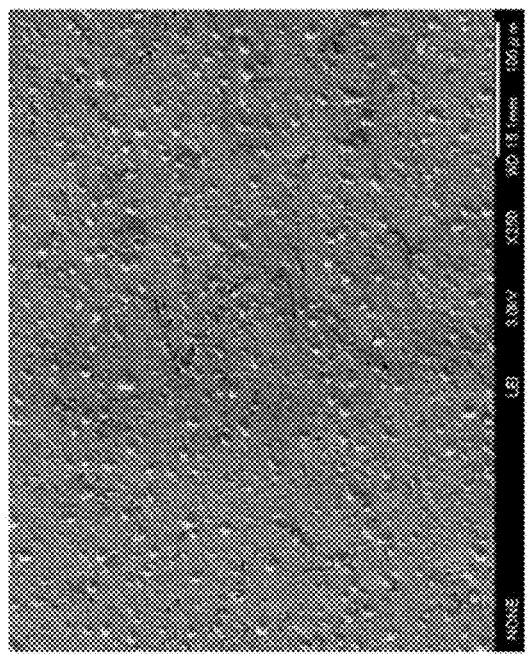
FIGS. 5A to 5C are electron microscope photographs showing a surface state (effect of adding the β-wollastonite powder and effect of adding two kinds or more nanometer-sized $SiO_2$ powder) after the co-firing process.
Figure 5B:
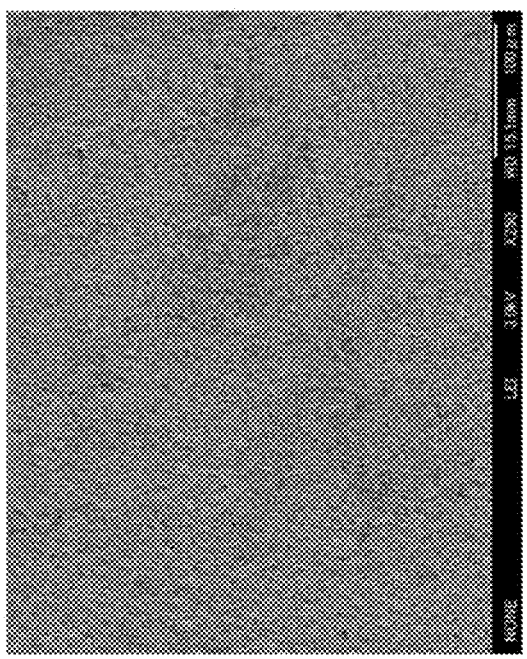
Figure 5C:
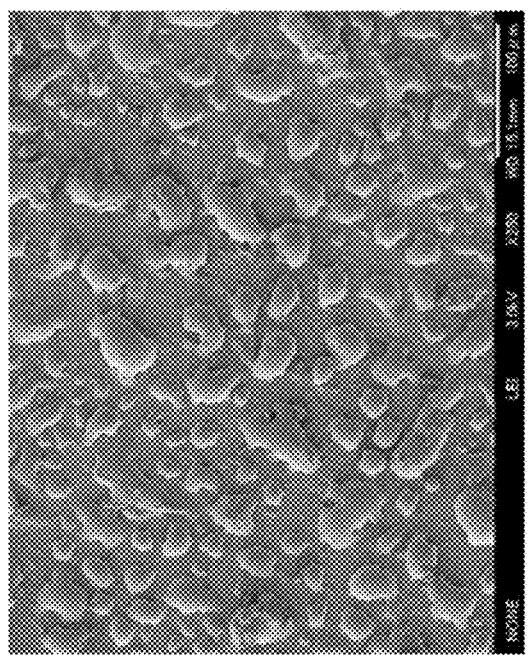

Finally, the effect of the present invention was confirmed based on the result of observing a surface state of the LTCC substrate after the co-firing process by an electron microscope photograph (FIGS. 5A to 5C). When Comparative example 1 containing only the glass powder without containing the $SiO_2$ powder and the β-wollastonite powder was co-fired, it was confirmed that the floating of the $B_2O_3$-rich glass phase densely existed on the surface in a grained state. In such a case, the migration of the silver to the $B_2O_3$-rich glass phase was remarkable. Thus, $R_{420}/R_{800}$ was deteriorated and disconnection or short circuiting of the electrode may occur. In the example where the β-wollastonite powder is added to Comparative example 1, although the floating of the $B_2O_3$-rich glass was reduced but did not completely disappear. In Example 14 where two or more kinds of nanometer-sized $SiO_2$ powders having different ranges of particle diameter are added in addition to the β-wollastonite, it was confirmed that the floating of the $B_2O_3$-rich glass phase completely disappeared and the surface was fine and smooth.

What is claimed is:

1. A low temperature co-fired substrate composition before a co-firing process, comprising:
   (A) 83 to 91 wt. % of glass powder containing CaO—$B_2O_3$—$SiO_2$ as a basic composition;
   (B) 7.5 to 14 wt. % of $SiO_2$ powder; and
   (C) 1.5 to 3 wt. % of β-wollastonite ($CaSiO_3$) powder, wherein
   a particle diameter $D_{50}$ of the glass powder (A) is 2.0 to 3.0 μm,
   the glass powder (A) contains 40.0 to 45.0 wt. % of CaO, 9.0 to 20.0 wt. % of $B_2O_3$ and 40.0 to 46.0 wt. % of $SiO_2$ as a composition,
   the $SiO_2$ powder (B) is a filler selected from the group consisting of (1), (2) and (3):
   (1) 10 to 30 wt. % of the $SiO_2$ powder having the particle diameter $D_{50}$ of 10 to 100 nm and 70 to 90 wt. % of the $SiO_2$ powder having the particle diameter $D_{50}$ of 400 to 3000 nm;
   (2) 60 wt. % or more of the $SiO_2$ powder having the particle diameter $D_{50}$ of 100 to 400 nm and less than 40 wt. % of the $SiO_2$ powder having the particle diameter $D_{50}$ of 400 to 3000 nm; and
   (3) 4 to 20 wt. % of the $SiO_2$ powder having the particle diameter $D_{50}$ of 10 to 100 nm, 60 to 95 wt. % of the $SiO_2$ powder having the particle diameter $D_{50}$ of 100 to 400 nm and 0 to 36 wt. % of the $SiO_2$ powder having the particle diameter $D_{50}$ of 400 to 3000 nm,
   the β-wollastonite ($CaSiO_3$) powder (C) is another filler having the particle diameter $D_{50}$ of 2.0 to 3.0 μm,
   when a silver paste, which functions as an electrode, is applied on a surface of a green sheet comprised of the low temperature co-fired substrate before the co-firing process and an organic binder and the co-firing process is performed, the low temperature co-fired substrate after the co-firing process has the following properties:
   a relative permittivity k is 6.0 or less at 2.5 GHz;
   a Q value which is a reciprocal of dielectric tangent is 500 or more at 2.5 GHz; and
   a ratio $R_{420}/R_{800}$ of a reflectance $R_{420}$ in a wavelength of 420 nm with respect to a reflectance $R_{800}$ in the wavelength of 800 nm is 85% or more.

\* \* \* \* \*